United States Patent
Bariska, Jr. et al.

(10) Patent No.: US 8,380,729 B2
(45) Date of Patent: Feb. 19, 2013

(54) SYSTEMS AND METHODS FOR FIRST DATA CAPTURE THROUGH GENERIC MESSAGE MONITORING

(75) Inventors: Arthur J. Bariska, Jr., Tucson, AZ (US); Marc A. Martin, Tucson, AZ (US); David C. Reed, Tucson, AZ (US); Max D. Smith, Tucson, AZ (US); Thaiese N. Trader, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 12/794,631

(22) Filed: Jun. 4, 2010

(65) Prior Publication Data

US 2011/0302192 A1   Dec. 8, 2011

(51) Int. Cl.
*G06F 17/30* (2006.01)
*G06F 7/00* (2006.01)
(52) U.S. Cl. ..................... 707/758; 707/802
(58) Field of Classification Search ............. 707/758
See application file for complete search history.

(56) References Cited

U.S. PATENT DOCUMENTS

| | | | |
|---|---|---|---|
| 7,904,348 B2 * | 3/2011 | Johnson et al. ............. 705/26.8 |
| 2002/0120738 A1 * | 8/2002 | Morimoto et al. ............ 709/224 |
| 2004/0225381 A1 | 11/2004 | Ritz et al. ..................... 700/26 |
| 2008/0004841 A1 | 1/2008 | Nakamura ..................... 702/186 |
| 2008/0215919 A1 | 9/2008 | Shaw ............................ 714/25 |
| 2008/0225732 A1 * | 9/2008 | Yoshizawa ................... 370/242 |
| 2008/0228886 A1 * | 9/2008 | Reed et al. ................... 709/206 |
| 2008/0250264 A1 | 10/2008 | Hourselt et al. .............. 714/2 |
| 2009/0044055 A1 | 2/2009 | Wang et al. ................... 714/27 |
| 2009/0183022 A1 | 7/2009 | Matsumoto et al. ............ 714/2 |

FOREIGN PATENT DOCUMENTS

JP   2005-100203   4/2005

OTHER PUBLICATIONS

CAPA: Corrective action—the ISO 9001 Standard requirements © 2010 9001quality http://www.9001quality.com/capa-corrective-preventive-action/53-corrective-action/80-capa-corrective-action-the-iso-9001-standard-requirements.html.
Failure Reporting, Analysis and Corrective Action System SEMATECH, SEMATECH, Inc. http://www.sematech.org/docubase/document/2332agen.pdf.

* cited by examiner

*Primary Examiner* — Kuen Lu
(74) *Attorney, Agent, or Firm* — Zilka-Kotab, PC (57) ABSTRACT

In one embodiment, a method for handling an error message includes interrogating an error message issued by a computing system to determine that the error message includes more than an alarm message, determining a message identifier relating to the error message, comparing the message identifier to entries in a database to determine an entry in the database that includes the message identifier, and outputting a set of documentation referenced by the entry in the database which includes the message identifier. In another embodiment, the database includes a plurality of searchable entries, each entry including: a message identifier, a product identifier, a set of documentation, and a set of actions. The set of documentation includes documents for the computing system to output and the set of actions includes actions for the computing system to perform. Other methods, systems, and computer program products are also described according to various embodiments.

20 Claims, 4 Drawing Sheets

SYSTEMS AND METHODS FOR FIRST DATA CAPTURE THROUGH GENERIC MESSAGE MONITORING

BACKGROUND

Currently, when an error, failure, abort, unexpected result, etc., (error) is encountered in a computing environment, a great amount of time and resources can be spent trying to determine a root cause of the error. Many times, insufficient information concerning the error is collected about the environment which caused or allowed the error to propagate, thereby diminishing the ability of a technician or a computer specialist to completely diagnose the issues surrounding the error in the computing environment. Often, users of the computing system must recreate one or more error situations to attempt to gather additional documentation concerning a subsequent error. In some situations, users of the computing environment rely on generic automation routines provided by original equipment manufacturers (OEMs) to supply documentation concerning the error, but these methods typically do not allow for sufficient granularity and action responses.

SUMMARY

In one embodiment, a method for handling an error message includes interrogating an error message issued by a computing system to determine that the error message includes more than an alarm message, determining a message identifier relating to the error message, comparing the message identifier to entries in a database to determine an entry in the database that includes the message identifier, and outputting a set of documentation referenced by the entry in the database which includes the message identifier. The set of documentation is usable to diagnose a cause of the error message issued by the computing system.

According to another embodiment, a method for constructing a database includes determining all possible error messages that a computing system can issue, each error message comprising a message identifier and a product identifier, relating each error message to a set of documentation that is useful to analyzing the error that causes the error message to issue, determining a set of actions that is useful to respond to the error that causes the error message to issue, and constructing a database having a plurality of entries. Each entry includes the message identifier, the product identifier, the set of documentation, and the set of actions. The set of documentation includes none, one, or more documents for the computing system to output, and the set of actions includes none, one, or more actions for the computing system to perform. The set of documentation is usable to diagnose a cause of the error message issued by the computing system.

In another embodiment, a computing system includes a processor for executing logic, logic for interrogating an error message issued by a computing system to determine that the error message includes more than an alarm message, logic for determining a message identifier relating to the error message, logic for comparing the message identifier to entries in a database to determine an entry in the database that includes the message identifier, and logic for outputting a set of documentation referenced by the entry in the database which includes the message identifier. The set of documentation is usable to diagnose a cause of the error message issued by the computing system.

According to another embodiment, a computer program product for handling an error message includes a computer readable storage medium having computer readable program code embodied therewith. The computer readable program code is configured to interrogate an error message issued by a computing system to determine that the error message includes more than an alarm message, to determine a message identifier relating to the error message, to determine a product identifier for a component of the computing system relating to the error message, to compare the message identifier to entries in a database to determine an entry in the database that includes the message identifier, to compare the product identifier to entries in the database to determine that at least one entry in the database includes the product identifier, to perform one or more actions referenced by the entry in the database which includes the message identifier, and to output at least one of: a set of documentation relating to the component from at least one entry in the database which includes the product identifier, and a set of documentation referenced by the entry in the database which includes the message identifier. The set of documentation relating to the component and the set of documentation referenced by the entry in the database are usable to diagnose a cause of the error message issued by the computing system.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

According to one embodiment, a new message monitor uses a unique product component identifier along with specific qualifiers in a message text to identify one or more sources of the message. For each component identifier, a unique table is constructed for each component to create a tailored list of documentation to collect in the event of an error, failure, abort, unexpected result, etc., (error). This documentation, in some approaches, may be general for any failure within a component, or, in some alternative approaches, it may be tailored to a unique or specific message identifier or a range of message identifiers. Depending on the type of error, different documentation may be collected, according to some approaches, which makes the new message monitor unique when compared to generic techniques in use currently. The set of documentation is usable to diagnose a cause of the error message issued by the computing system.

In one general embodiment, a method for handling an error message includes interrogating an error message issued by a computing system to determine that the error message includes more than an alarm message, determining a message identifier relating to the error message, comparing the message identifier to entries in a database to determine an entry in the database that includes the message identifier, and outputting a set of documentation referenced by the entry in the database which includes the message identifier. The set of documentation is usable to diagnose a cause of the error message issued by the computing system.

According to another general embodiment, a method for constructing a database includes determining all possible error messages that a computing system can issue, each error message comprising a message identifier and a product identifier, relating each error message to a set of documentation that is useful to analyzing the error that causes the error message to issue, determining a set of actions that is useful to respond to the error that causes the error message to issue, and constructing a database having a plurality of entries. Each entry includes the message identifier, the product identifier, the set of documentation, and the set of actions. The set of documentation includes none, one, or more documents for the computing system to output, and the set of actions includes none, one, or more actions for the computing system to perform. The set of documentation is usable to diagnose a cause of the error message issued by the computing system.

In another general embodiment, a computing system includes a processor for executing logic, logic for interrogating an error message issued by a computing system to determine that the error message includes more than an alarm message, logic for determining a message identifier relating to the error message, logic for comparing the message identifier to entries in a database to determine an entry in the database that includes the message identifier, and logic for outputting a set of documentation referenced by the entry in the database which includes the message identifier. The set of documentation is usable to diagnose a cause of the error message issued by the computing system.

According to another general embodiment, a computer program product for handling an error message includes a computer readable storage medium having computer readable program code embodied therewith. The computer readable program code is configured to interrogate an error message issued by a computing system to determine that the error message includes more than an alarm message, to determine a message identifier relating to the error message, to determine a product identifier for a component of the computing system relating to the error message, to compare the message identifier to entries in a database to determine an entry in the database that includes the message identifier, to compare the product identifier to entries in the database to determine that at least one entry in the database includes the product identifier, to perform one or more actions referenced by the entry in the database which includes the message identifier, and to output at least one of: a set of documentation relating to the component from at least one entry in the database which includes the product identifier, and a set of documentation referenced by the entry in the database which includes the message identifier. The set of documentation relating to the component and the set of documentation referenced by the entry in the database are usable to diagnose a cause of the error message issued by the computing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
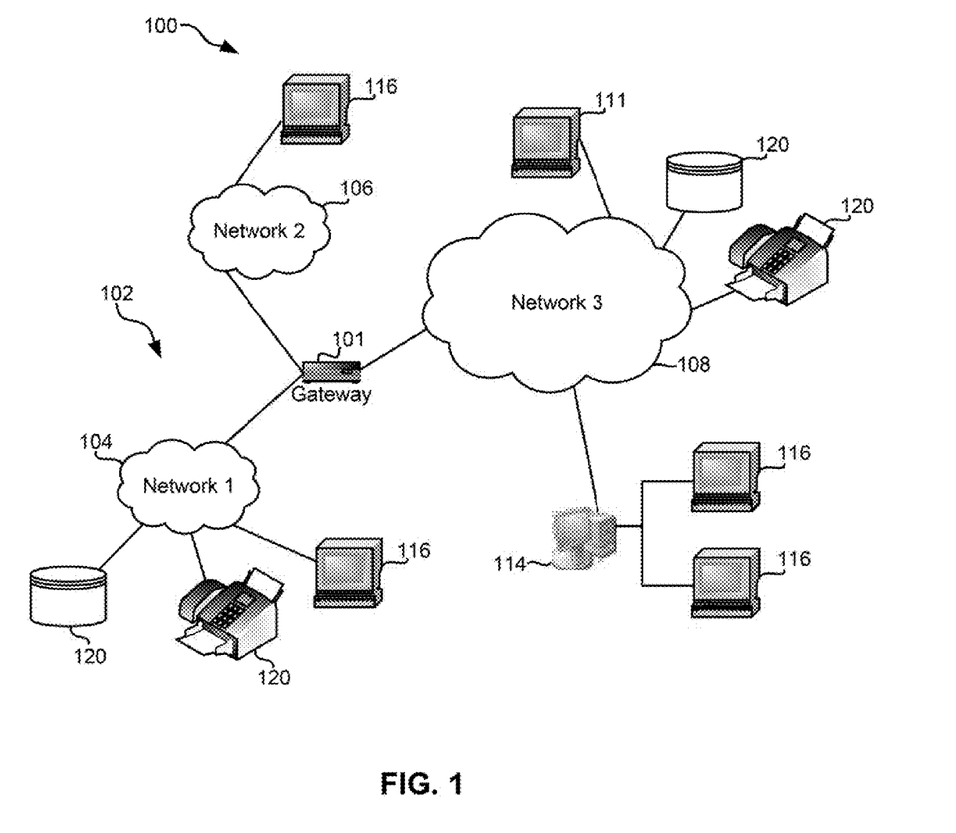
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
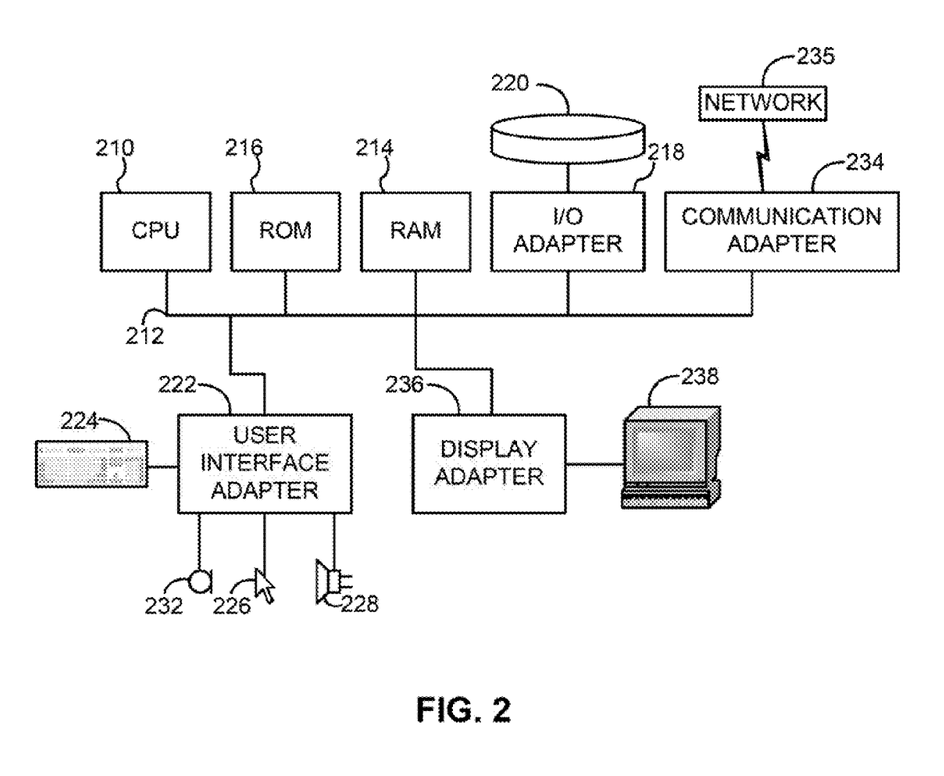
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

According to one embodiment, a message monitor may interrogate every message that is issued by a computing system (which may be a remote computing system, a subsystem of another system, etc.), compare a product identifier (ID) and/or message identifier (ID) to a table, file, database, etc., having a collection of documents (e.g., recommended actions, required actions, support actions, etc.) relating to each product ID and/or message ID in response to the product ID/message ID being issued. The product ID may be related to a component of the computing system, such as a catalog, decision support system (DSS), allocation, etc. For example, in one approach, a collection of documentation relating to a failure may be referenced in the table, which directs an application to collect the documentation listed in the table and send the documentation to a remote site where a technician and/or computer specialist may use that documentation to diagnose the error on the computing system. If an entry in the table, file, database, etc., does not match either the product ID or the message ID, then a generic set of documents may be collected, according to a generic entry in the table, file, database, etc., and/or a generic response based on a general response to all errors messages.

The entries in the table, file, database, etc., may be created by whichever products/components are running on the computing system, according to one approach. In another approach, the entries in the table, file, database, etc., may be updated by whichever products/components are running on the computing system. In another embodiment, the creating and/or updating may be carried out by designated routine running on the computing system which is different than the products/components running on the computing system performing other tasks. Additionally, the table, file, database, etc., may be customized by a user of the computing system, by a technician or computer specialist performing maintenance on the computing system, or by anyone else who has access to the entries in the table, file, database, etc., remotely or locally. This customization may account for specific applications which are running on and/or added to the computing system after an initialization of the message monitoring.

According to one embodiment, the information in the table may be general, such as information relating to each component individually, and after every message, a dump of the information is made. In another embodiment, the information in the table may be granular, such as a list for each message which directs an application to collect a specific piece of documentation that concerns the error which propagated the message.

There are many types of documentation that may be collected when an error message is issued. For example, in an IBM z/OS system, the following resources may be used to pull documentation from: LISTCAT, DEVSERV, DISPLAY SMS, LISTVTOC, DUMPS, etc., all of which are documentation sources from which information may be collected concerning an error. Furthermore, from text in the message, such as a data set name, volume serial, device addresses, etc., the message monitor may trigger an appropriate task to perform, which could then collect the documentation. In one embodiment, once the documentation is collected, it may be stored to a repository/data set for this particular job. Additionally, all documentation may be stored to this repository/data set until the job completed, in one approach. If the job does not complete successfully, this repository/data set may be available for review and submission to the appropriate system for assistance in diagnosing the error, according to another approach. If the job completes successfully, the repository/data set may be deleted immediately, soon thereafter, or kept for a user-defined period of time in case an error occurs concerning an output of the job, in another approach.

In addition to First Failure Data Capture and documentation collection, the table, file, database, etc., may cause corrective actions to be taken for some errors issued, and/or automatic notification of the error to support staff to resolve the situation, etc.

According to one embodiment, a message monitor may interrogate error messages such that only error messages having a nonzero return code are further handled. Further, a table may be used with this type of information to parse the error message, take action(s) described in the table, and store an output from performing the action(s). In one approach, the output may be associated with the job that the error message was issued for.

Table 1, below, includes one example of a partial table for comparing product and/or error identifiers to. Table 1 is an example which relates to an IBM z/OS system, but the table may be created by and/or for any system which produces error messages. An exemplary error message is also produced below for reference.

10.22.30 JOB01178 JOB=IRKDF05 STEP=RESTORE1 PGM=ADRDSSU CC=0008 ADR350E (ttt)-mmmmm (yy), {I/O|LOGICAL ERROR} ENCOUNTERED ON {VVDS|VVDS IMAGE} ON volume_serial_number

TABLE 1

Example Partial Table

| Message ID | Message Parsing Information | Action Taken By Monitor |
|---|---|---|
| ADR&&&E | N/A (any instance for DSS component error) | D GRS (get contention info) |
| ADR350E | ADR350E (ttt)-mmmmm(yy), {I/O | LOGICAL ERROR} ENCOUNTERED ON {VVDS | VVDS IMAGE} ON volume_serial_number | Run IDCAMS Job: LIST VTOC volser<br>Run IDCAMS Job: EXAMINE VOL volser |
| ADR966E | ADR966E (ttt)-mmmmm(yy), DATA SET dsname IN CATALOG catname CANNOT BE COPIED AND DELETED BECAUSE IT HAS LOCKS ASSOCIATED WITH IT | Run IDCAMS LISTCAT dsname |
| ADR829E | ADR829E (ttt)-mmmmm(yy), {FCINCREMENTAL | FCINCREMENTALLAST} WAS SPECIFIED | BUT-INCREMENTAL FLASHCOPY COULD NOT BE ATTEMPTED FROM VOLUME | src_volser TO VOLUME tgt_volser | DEVSERV QDASD, srvvol<br>DEVSERV QDASD, tgtvol |
| ARC&&&E | N/A (any instance for HSM component error) | D GRS (get contention info) |
| ARC0785E | ARC0785E CATALOG OF DATA SET {dsname} ON VOLUME MIGRAT FAILED, CATALOG RETURN CODE = {catrc}, CATALOG REASON CODE = {catreas} | F DFHSM, FIXCDS MCD dsname<br>Run IDCAMS job: LISTCAT dsname |
| ARC1187E | ARC1187E RECALL FAILED DUE TO AN ERROR WITH THE COMMON RECALL QUEUE | D CF (coupling facility info) |
| ARC1505E | ARC1505E THE {ENTRIES | ELEMENTS} FOR STRUCTURE structure_name ARE MORE THAN 95% IN-USE. ALL NEW REQUESTS WILL BE DIRECTED TO THE LOCAL QUEUE. | D CF, STR(structure name) |

As can be seen in Table 1, a message identifier (ID) may include multiple parts. In the example, the first portion of the message ID, "ADR," identifies the component which produced the error. The second portion of the message ID, "350E," is an error message ID which includes specific parsing information. For the error having a message ID of "ADR350E," the information included with the error message is: "ADR350E (ttt)-mmmmm(yy), {I/O|LOGICAL ERROR} ENCOUNTERED ON {VVDS|VVDS IMAGE} ON volume_serial_number," which includes a timestamp "(ttt)-mmmmm(yy)," what the error is in response to "{I/O|LOGICAL ERROR} ENCOUNTERED ON {VVDS|VVDS IMAGE}," and where the error occurred "ON volume_serial_number," according to one example. Of course, any other desired information may be included as message parsing information. Table 1 also includes examples of actions that may be taken in response to an error message being issued. For error message ID "ADR350E," there are two actions listed: "Run IDCAMS Job: LIST VTTOC volser," and "Run IDCAMS Job: EXAMINE VOL volser." Of course, more or less actions may be included for each error message ID, and other types of actions may be taken in addition to running applications.

Figure 3:
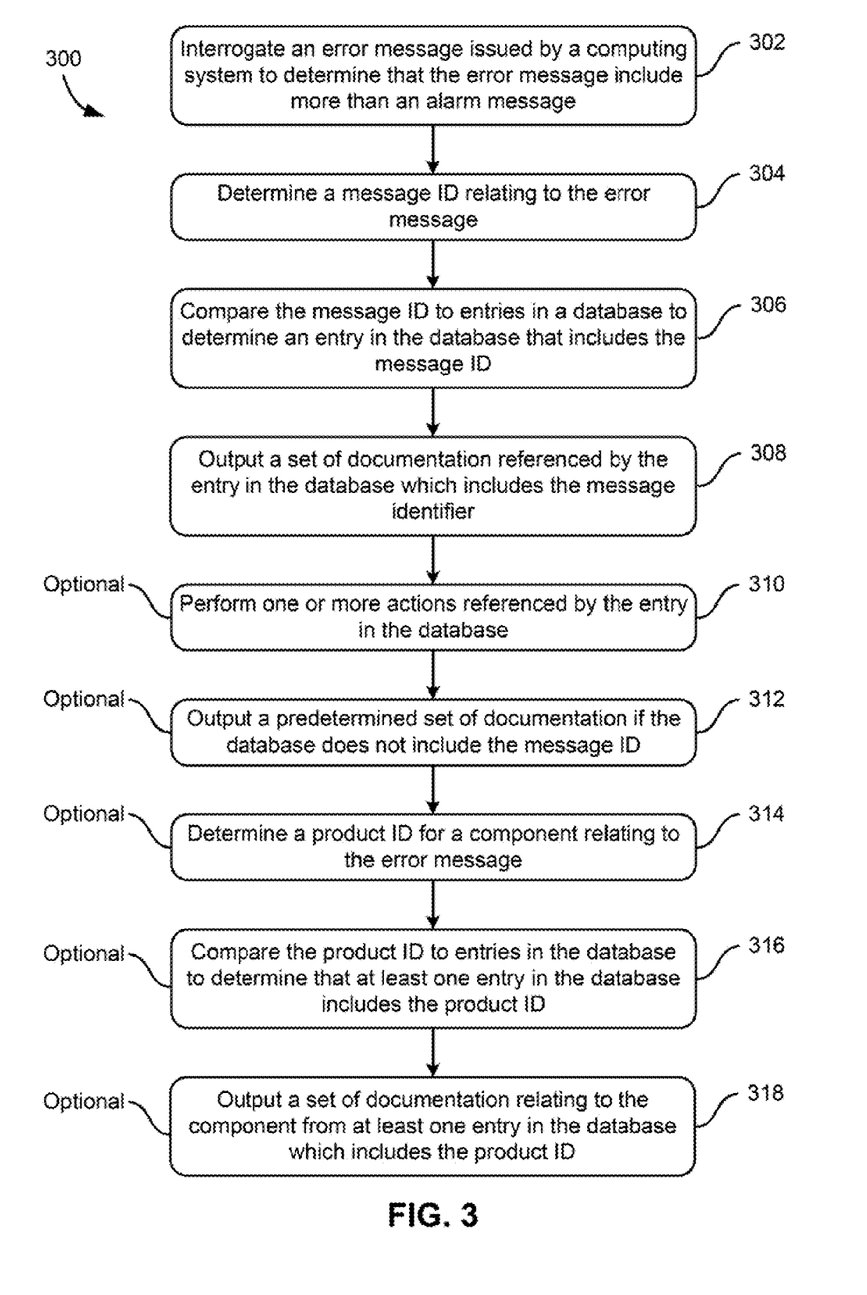
FIG. 3 is a flowchart of a method, according to one embodiment.

Now referring to FIG. 3, a method 300 for handling an error message is shown according to one embodiment. The method 300 may be executed in any desired environment, including those described in FIGS. 1-2, and may include additional operations not described below.

In operation 302, an error message issued by a computing system is interrogated to determine that the error message includes more than an alarm message. In one embodiment, this includes determining that the error message does not have a zero return code, which indicates that the error message is a low-level error.

In operation 304, a message identifier (ID) relating to the error message is determined. In one embodiment, the message ID relating to the error message is determinable from the error message. For example, the error message may include a portion which is a message ID, and possibly other portions which may include other information, such as a product identifier (ID), time, date, etc. In one example, the error message may be: "10.22.30 JOB01178 JOB=IRKDF05 STEP=RESTORE1 PGM=ADRDSSU CC=0008 ADR350E (ttt)-mmmmm(yy), {I/O|LOGICAL ERROR} ENCOUNTERED ON {VVDS|VVDS IMAGE} ON volume_serial_number," which includes a message ID of "ADR350E," which can be used in later operations.

In operation 306, the message ID is compared to entries in a database to determine an entry in the database that includes the message ID. According to one preferred embodiment, the database may include a plurality of searchable entries. Each entry may include a message ID, a product ID, a set of documentation, and a set of actions. The set of documentation may include none, one, or more documents for the computing system to output, and the set of actions may include none, one, or more actions for the computing system to perform. For example, a database may be created for a particular component in the computing system. Therefore, this database would include multiple entries, each having the same product ID. In another example, a single database may include entries for a plurality of components in the computing system, and may include multiple entries having many different product IDs.

In one approach, each entry in the database may include a message ID which is related to a set of documentation. The set of documentation may be specific for the component related to the product ID, or may be more generally applicable. In another approach, the set of documentation may be collected routinely while executing functions on the computing system, or may be collected once an error message is issued.

In operation 308, a set of documentation referenced by the entry in the database which includes the message identifier is output. In some approaches, the outputting may be displaying to a monitor, transferring to another system, storing to a storage medium, printing, alerting a support person as to the error, etc.

In one embodiment, outputting the set of documentation referenced by the entry in the database may include transferring the set of documentation from the computing system to a remote computing system, such as a monitoring site where technicians and/or computer specialists may interpret the set of documentation to analyze the error which caused the error message.

In optional operation 310, one or more actions referenced by the entry in the database which includes the message identifier are performed. The actions may be of any type, including accessing logs, databases, repositories, dumps, etc. The actions may also be performed by any system, including the computing system on which the database is stored.

In optional operation 312, a predetermined set of documentation is output if the database does not include the message ID. For example, if the entire message ID is not included in the database, then a default set of documentation may be output, in any form. This default set of documentation may include general dumps, logs, databases, executed code, functioning components, etc. This functionality is presented as a fallback provision in case the database is not updated consistently, or if an error message is not described in the database by accident or because the default set of documentation is sufficient for some error messages.

In optional operation 314, a product identifier (ID) for a component relating to the error message is determined. The product ID may be a portion of the error message, in some approaches. Also, the database may be specific to the component in the computing system which relates to the product ID.

In optional operation 316, the product ID is compared to entries in the database to determine that at least one entry in the database includes the product ID. This is similar to the comparison performed for the message ID, but it may result in multiple entries being returned having the product ID. In this case, all returned entries may be selected. In another embodiment, when databases are created specifically for a single product ID, this product ID comparison may be performed to determine the database which includes the entries which are specifically tailored for the particular component in the computing system which has the relevant product ID.

In optional operation 318, a set of documentation relating to the component from at least one entry in the database which includes the product ID is output. This may be a default set of documentation for the particular component having the product ID, it may be one or more sets of documentation from the at least one entry in the database having the product ID, it may be a set of documentation based on the combination of the product ID and the message ID, etc.

In one embodiment, the relationship between the component and the error message may be that the component caused the error message to be issued by the computing system. In another embodiment, the component may have been affected by the error, may have been a contributing factor in the error being issued, may have been monitoring for the error, etc.

In one approach, the database may be accessible to the computing system that issued the error message and the computing system compares the message identifier to entries in the database. In another approach, the database may be stored to the computing system that issued the error message, may be created by the computing system, etc.

Figure 4:
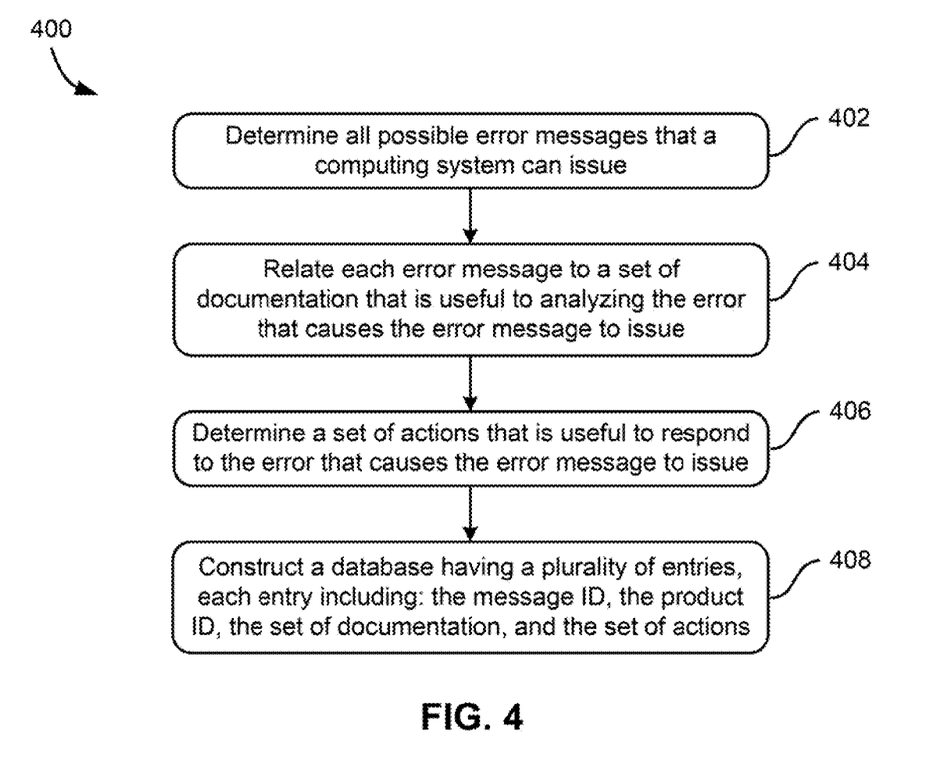
FIG. 4 is a flowchart of a method, according to one embodiment.

Now referring to FIG. 4, a method 400 for constructing a database is shown according to one embodiment. The method 400 may be executed in any desired environment, including those described in FIGS. 1-2, and may include additional operations not described below.

In operation 402, all possible error messages that a computing system can issue are determined. Each error message includes a message identifier (ID) and possibly a product identifier (ID). The message ID may include descriptions of the error and associated details, such as time, date, severity of the error, etc. The product ID may include a component in the computing system which caused the error, was affected by the error, etc.

In operation 404, each error message is related to a set of documentation that is useful to analyzing the error that causes the error message to issue. This set of documentation may be specific to each message ID, to each product ID, or to a combination of the product ID and the message ID. Any type of documentation may be related to the IDs (for use in a later operation), as would be known to one of skill in the art, such as logs, databases, dumps, executed code, etc.

In one approach, if no documentation is specifically relevant to one or more of the error messages that can issue from the computing system, then the set of documentation for these entries is empty, e.g., no documentation is included in the database for these entries. For example, the set of documentation may include none, one, or more documents for the computing system to output.

In more approaches, the set of documentation may be collected at the time of the error being acknowledged, when the database is created, periodically updated over time to remain relevant, etc.

In operation 406, a set of actions that is useful to respond to the error that causes the error message to issue is determined. This set of actions may be specific to each message ID, to each product ID, or to a combination of the product ID and the message ID. Any type of action may be included in the database (for use in a later operation), as would be known to one of skill in the art, such as executing a program, gathering files, running scripts, alerting operators to the error, etc.

In one approach, if no actions are specifically relevant to one or more of the error messages that can issue from the computing system, then the set of actions for these entries is empty, e.g., no action to perform is included in the database for these entries. For example, the set of actions may include none, one, or more actions for the computing system to perform.

In more approaches, the set of actions may be performed by the computing system or by some other system capable of performing the requested actions in the database.

In operation 408, a database having a plurality of entries is constructed. Each entry includes: the message ID, the product ID, the set of documentation, and the set of actions.

Of course, a computing system, such as that presented in FIG. 2, may include all of the functionality necessary to execute one or both of the methods 300, 400 described above. For example, in one embodiment, a computing system includes a processor for executing logic, logic for interrogating an error message issued by a computing system to determine that the error message includes more than an alarm message, logic for determining a message identifier relating to the error message, logic for comparing the message identifier to entries in a database to determine an entry in the database that includes the message identifier, and logic for outputting a set of documentation referenced by the entry in the database which includes the message identifier.

Any of the above described embodiments and/or approaches may be implemented as logic in the computing system, and/or may become a functioning part of the computing system.

In another embodiment, a computer program product may include some or all of the functionality of either or both of methods 300 and 400. For example, a computer program product for handling an error message may include a computer readable storage medium having computer readable program code embodied therewith. The computer readable program code includes computer readable program code configured to: interrogate an error message issued by a computing system to determine that the error message includes more than an alarm message, determine a message identifier relating to the error message, determine a product identifier for a component of the computing system relating to the error message, compare the message identifier to entries in a database to determine an entry in the database that includes the message identifier, compare the product identifier to entries in the database to determine that at least one entry in the database includes the product identifier, perform one or more actions referenced by the entry in the database which includes the message identifier, and output at least one of a set of documentation relating to the component from at least one entry in the database which includes the product identifier, and a set of documentation referenced by the entry in the database which includes the message identifier.

Any of the above described embodiments and/or approaches may be implemented as computer readable program code in the computer program product, and/or may become a functioning part of the computing system in which the computer program product is implemented.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for handling an error message, the method comprising:
   interrogating an error message issued by a computing system to determine that the error message includes more than an alarm message by determining that the error message has a nonzero return code;
   determining a message identifier relating to the error message;
   comparing the message identifier to entries in a database to determine an entry in the database that includes the message identifier;

outputting a set of documentation referenced by the entry in the database which includes the message identifier; and outputting a predetermined set of documentation when the database does not include the message identifier, wherein the set of documentation is usable to diagnose a cause of the error message issued by the computing system.

2. The method of claim 1, further comprising performing one or more actions referenced by the entry in the database which includes the message identifier.

3. The method of claim 1, wherein the database does not include the message identifier when the predetermined set of documentation is sufficient for the error message relating to the message identifier.

4. The method of claim 1, wherein the database is accessible to the computing system that issued the error message and the computing system compares the message identifier to entries in the database.

5. The method of claim 1, wherein the message identifier relating to the error message is determinable from the error message.

6. The method of claim 1, wherein outputting the set of documentation referenced by the entry in the database comprises transferring the set of documentation from the computing system to a remote computing system.

7. The method of claim 1, further comprising:
determining a product identifier for a component relating to the error message;
comparing the product identifier to entries in the database to determine that at least one entry in the database includes the product identifier; and
outputting a set of documentation relating to the component from at least one entry in the database which includes the product identifier.

8. The method of claim 7, wherein the relationship between the component and the error message is that the component caused the error message to be issued by the computing system.

9. The method of claim 1, wherein the database comprises:
a plurality of searchable entries, each entry including:
a message identifier;
a product identifier;
a set of documentation; and
a set of actions,
wherein the set of documentation includes none, one, or more documents for the computing system to output, and
wherein the set of actions includes none, one, or more actions for the computing system to perform.

10. A method for constructing a database, the method comprising:
determining all possible error messages having a nonzero return code that a computing system can issue, each error message comprising a message identifier and a product identifier;
relating each error message to a set of documentation that is useful to analyzing the error that causes the error message to issue;
determining a set of actions that is useful to respond to the error that causes the error message to issue; and
constructing a database having a plurality of entries, each entry including:
the message identifier;
the product identifier;
the set of documentation; and
the set of actions,
wherein the set of documentation includes none, one, or more documents for the computing system to output, wherein the set of documentation includes no documents when a default set of documentation is sufficient for a related error message,
wherein the set of actions includes none, one, or more actions for the computing system to perform, and
wherein the set of documentation is usable to diagnose a cause of the error message issued by the computing system.

11. A computing system comprising:
a hardware processor for executing logic;
logic for interrogating an error message issued by a computing system to determine that the error message includes more than an alarm message by determining that the error message has a nonzero return code;
logic for determining a message identifier relating to the error message;
logic for comparing the message identifier to entries in a database to determine an entry in the database that includes the message identifier; and
logic for outputting a set of documentation referenced by the entry in the database which includes the message identifier,
wherein the set of documentation is usable to diagnose a cause of the error message issued by the computing system.

12. The computing system of claim 11, further comprising logic for performing one or more actions referenced by the entry in the database which includes the message identifier.

13. The computing system of claim 11, further comprising logic for outputting a predetermined set of documentation if the database does not include the message identifier.

14. The computing system of claim 11, wherein the database is accessible to the computing system that issued the error message and the computing system compares the message identifier to entries in the database.

15. The computing system of claim 11, wherein the message identifier relating to the error message is determinable from the error message.

16. The computing system of claim 11, wherein the logic for outputting the set of documentation referenced by the entry in the database comprises transferring the set of documentation from the computing system to a remote computing system.

17. The computing system of claim 11, further comprising:
logic for determining a product identifier for a component relating to the error message;
logic for comparing the product identifier to entries in the database to determine that at least one entry in the database includes the product identifier; and
logic for outputting a set of documentation relating to the component from at least one entry in the database which includes the product identifier.

18. The computing system of claim 17, wherein the relationship between the component and the error message is that the component caused the error message to be issued by the computing system.

19. The computing system of claim 11, wherein the database comprises:
a plurality of searchable entries, each entry including:
a message identifier;
a product identifier;
a set of documentation; and
a set of actions, wherein the set of documentation includes none, one, or more documents for the computing system to output, and wherein the set of actions includes none, one, or more actions for the computing system to perform.

20. A computer program product for handling an error message, the computer program product comprising:

a non-transitory computer readable storage medium having computer readable program code embodied therewith, the computer readable program code comprising:

computer readable program code configured to interrogate an error message issued by a computing system to determine that the error message includes more than an alarm message by determining that the error message has a nonzero return code;

computer readable program code configured to determine a message identifier relating to the error message;

computer readable program code configured to determine a product identifier for a component of the computing system relating to the error message;

computer readable program code configured to compare the message identifier to entries in a database to determine an entry in the database that includes the message identifier;

computer readable program code configured to compare the product identifier to entries in the database to determine that at least one entry in the database includes the product identifier;

computer readable program code configured to perform one or more actions referenced by the entry in the database which includes the message identifier; and computer readable program code configured to output at least one of: a set of documentation relating to the component from at least one entry in the database which includes the product identifier, and a set of documentation referenced by the entry in the database which includes the message identifier, wherein the set of documentation relating to the component and the set of documentation referenced by the entry in the database are usable to diagnose a cause of the error message issued by the computing system.

* * * * *